United States Patent Office 2,776,209
Patented Jan. 1, 1957

2,776,209

PAPER DEINKING AND DEWAXING PROCESS

Denis J. O'Flynn, Wilmington, Del., assignor to E. I. du Pont de Nemours and Company, Wilmington, Del., a corporation of Delaware No Drawing. Application April 21, 1954,
Serial No. 424,756

4 Claims. (Cl. 92—1.5)

This invention relates to a process for recovery of waste paper and more particularly to a waste paper and pulp recovery process employing a deinking and dewaxing agent which had not heretofore been employed for this purpose.

Recend trends in the pulp and paper industry have led to the use of various improved techniques in the recovery of pulp from printed paper. In recent times shortages have, on occasion, occurred in the nation's pulp and paper supply, and when these shortages are acute relatively lower grades of waste papers are subjected to deinking and pulp recovery operations. Until rather recently, these deinking operations relied primarily on the use of caustic or other alkalies as the deinking agent. In other processes acidic materials were used for this purpose. Miscellaneous deinking agents were also developed especially in foreign countries (German Patent 657,638 and 257,667 and 267,472, French Patents 849,-473 and 864,428; British Patents 495,636 and 596,472, etc.). In this country one of the modern innovations has been to deink waste paper stock with peroxides. Thus, it has been found that through the use of sodium peroxide in the deinking process it is practical to use lower grade papers and yet meet a high standard in paper quality (Chemical Engineering 55, 106 (48)).

In waste papers, it frequently happens that paraffin wax, or other waxy materials are present, and interfere with the recovery process. It is desirable to provide a means for removing the source of difficulty, also.

An object of this invention is to provide still further improvements in processes for recovery of used paper. Other objects of the invention will appear hereinafter.

It has been discovered in accordance with this invention that urea is an excellent agent for use in the deinking and dewaxing of paper in otherwise conventional recovery operations.

The theoretical explanation for the deinking effect of urea is not necessarily understood but it is believed to have some relationship with the ability of urea to form complexes with various types of organic compounds. In this connection it has been known for many years that complexes of a rather wide variety are produced when urea is brought into contact with certain classes of organic compounds. For example, normal hydrocarbons form complexes but those of branched chain do not. Drying oil acids and simple esters thereof can be fractionated into various compounds of different iodine numbers through the use of selective urea complex formation. Certain extraordinary theories have been proposed in recent years to act for the formation of specific complexes (Ann. 565, 204 (1949); J. Chem. Physics, 18, 150 (1950)). Whatever the theoretical explanation, the fact remains that the addition of urea to the materials (including printed paper) going into a hydrapulper or similar deinking apparatus conventionally employed in waste paper recovery processes, produces a rather surprising and highly useful deinking effect.

The dewaxing effect evidently occurs by a mechanism similar to that of the deinking effect.

While the deinking and dewaxing operation can be performed under a reasonably wide variety of pH and temperature conditions it is generally desirable to employ a neutral or slightly alkaline pH. A pH in the range of about 7 to 9 is entirely suitable. This can be achieved by the addition of caustic or other alkaline additives or by means of suitable buffers. Elevated temperatures are generally employed as is the case with other deinking agents. Suitable temperatures are in the range of about 70° C. to about 100° C. The time required for deinking is generally not more than about 15 minutes. Frequently the dewaxing effect is incidental to deinking, and of course it is not essential to continue the operation until all of the wax has been removed from the paper.

The invention is illustrated further by means of the following examples.

*Example 1.*—Waste magazine paper was beaten to a pulp in an aqueous medium which had been adjusted to a pH of 9.0 by the addition of 5% aqueous sodium hydroxide solution. To this mixture was added 5% by weight of urea based on the weight of the pulp. The beating was continued at 70–100° C. for approximately 10 minutes whereupon the paper was filtered through a 60 mesh screen. The resulting pulp was beaten in a Waring Blendor and the slurry thus obtained was filtered through the screen again. Under sheet-forming conditions, a control experiment was made under the same conditions using only the sodium hydroxide additive without urea. A composition of the resulting paper showed that the brightness level had been raised appreciably from about 62 to 70 points as measured on the General Electric brightness tester.

*Example 2.*—A mixture composed of waste waxed paper (used drinking cups) and aqueous urea (5% aqueous solution) was beaten at 80° C. for 15 minutes at a slightly alkaline pH. Wax was thus removed from the surface of the paper.

It is to be understood that the present invention is not limited to the embodiment illustrated in the foregoing examples and that numerous other embodiments of the invention will occur to those who are skilled in the art. For example, the use of additives, dispersing agents, etc. along with the urea is quite possible and produces in many instances somewhat desirable results.

The present invention does not include previously known processes for softening paper by addition of urea thereto. In the process of this invention, the urea is present in the pulper, and the treatment with urea is continued, generally at elevated temperature, until deinking is substantially complete.

The present invention is highly useful in that it decreases or eliminates the bleaching with sodium hypochlorite which generally is required in deinking processes employing caustic or other previously known agents. The paper obtained by the practice of the present invention is of good quality and can be employed for any of the purposes requiring ordinary grade or good grade paper.

I claim:

1. A process for recovery and deinking of used printed paper which comprises subjecting the said used paper to a pulping operation in a non-acidic aqueous solution of urea until deinking of the paper is substantially complete.

2. Process of claim 1 performed at a pH of 7–9.

3. Process of claim 2 performed at a temperature of 70°–100° C.

4. Process of claim 3 wherein the content of urea in the pulper is about 5% of the weight of pulp fibers.

References Cited in the file of this patent

UNITED STATES PATENTS

| 1,993,362 | Crisp | Mar. 5, 1935 |
| 2,611,694 | Becher | Sept. 23, 1952 |

OTHER REFERENCES

Ellis: Printing Inks, pages 480 and 481, published by Reinhold Pub. Corp., N. Y., 1940.